(12) United States Patent
Yamazaki et al.

(10) Patent No.: US 6,265,720 B1
(45) Date of Patent: Jul. 24, 2001

(54) RADIOGRAPHIC APPARATUS

(75) Inventors: Tatsuya Yamazaki; Yutaka Endo, both of Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/006,199

(22) Filed: Jan. 13, 1998

(30) Foreign Application Priority Data

Jan. 14, 1997 (JP) .................................................. 9-017536
Dec. 29, 1997 (JP) .................................................. 9-369403

(51) Int. Cl.[7] .................................................. G01T 1/00
(52) U.S. Cl. .............................. 250/370.09; 250/363.09; 250/252.1; 250/374
(58) Field of Search ................... 250/370.09, 363.09, 250/252.1, 374

(56) References Cited

U.S. PATENT DOCUMENTS

| | | | |
|---|---|---|---|
| 5,103,092 | * | 4/1992 | Takahashi et al. .............. 250/363.09 |
| 5,519,437 | | 5/1996 | Nelvig .................................. 348/162 |
| 5,528,043 | * | 6/1996 | Spivey et al. .................... 250/370.09 |
| 5,534,695 | * | 7/1996 | Miyoshi et al. .............. 250/252.1 A |
| 5,604,781 | | 2/1997 | Suzuki et al. . |

FOREIGN PATENT DOCUMENTS

| | | |
|---|---|---|
| 196 04 631 | 8/1996 | (DE) . |
| 0 855 678 | 7/1998 | (EP) . |
| 5-6161781 | 12/1981 | (JP) . |
| 7-56251 | 3/1995 | (JP) . |

OTHER PUBLICATIONS

European Patent Search Report dated Mar. 17, 2000 ( Ref. No. EP 21127)*

* cited by examiner

Primary Examiner—Constantine Hannaher
Assistant Examiner—Andrew Israel
(74) Attorney, Agent, or Firm—Fitzpatrick, Cella, Harper & Scinto

(57) ABSTRACT

An apparatus for photographing a radiographic image, has an image sensing system for obtaining a radiographic image; an image process system for correcting the radiographic image obtained by the image sensing system using input/output characteristics in units of pixels of the image sensing system, and outputting the corrected radiographic image; and a predetermined factor detecting unit for monitoring a predetermined factor value that ultimately influences the output from the image process system.

21 Claims, 5 Drawing Sheets

RADIOGRAPHIC APPARATUS

BACKGROUND OF THE INVENTION

1. Field of the Invention

The present invention relates to a radiographic apparatus which can present fine contrast of image information.

2. Related Background Art

In general, a radiographic apparatus is used in the fields of medical radiography, industrial nondestructive radiography, and the like. The use mode of the apparatus will be described below with reference to FIG. 1. When radiation generated by a radiation source 1 is irradiated onto an object S, the radiation is intensity-modulated and scattered in accordance with the internal structure of the object S owing to interactions such as absorption, scattering, and the like of the object S with respect to the radiation, and then enters a radiographic unit 2. In the radiographic unit 2, a housing 3 which has a window portion for transmitting the radiation and intercepts light from its interior, a grid 4 for removing unwanted scattered radiation produced by the object S, a phosphor 5 for converting the radiation into fluorescence, and an image receiving means 6 sequentially are arranged.

The radiation reaches the grid 4 via the radiation window portion of the housing 3. The grid 4 is normally a plate obtained by cutting a multi-layered member obtained by alternately stacking lead plates and aluminum plates, and removes unwanted scattered radiation produced by the object S by matching the directions of the nearly parallel lead plates with the primary radiation traveling direction, thus improving the contrast of a radiographic image which is transmitted through the grid 4.

In general, as the phosphor 5, an intensifying screen obtained by applying $CaWO_4$ or $Gd_2O_2S$:Tb on a support material, or a fluorescent crystal such as CsI is used. Since the phosphor 5 has characteristics of emitting fluorescence at an intensity proportional to the dose of radiation, the radiographic image is converted into a visible light image by the phosphor 5. The image receiving means 6 disposed behind the phosphor 5 generates an image corresponding to the received light amount, and the visible light image generated by the phosphor 5 is converted into an image corresponding to its light amount by the image receiving means 6.

Normally, the image receiving means 6 comprises a film, and the radiographic image is recorded as a latent image that gives a photographic density nearly proportional to the logarithm of the amount of fluorescence on the film. After development, the recorded image is presented as a visible image, which is used in diagnosis, inspection, and the like.

Also, a computed radiography (CR) apparatus using an imaging plate applied with a BaFBr:Eu phosphor and BaF:Eu phosphor as photostimulable phosphors is also used. When the imaging plate that has been primarily excited upon irradiation of radiation is subjected to secondary excitation using visible light such as a red laser beam or the like, emission called photostimulated fluorescence is produced. The CR apparatus detects this emission using a photosensor such as a photomultiplier or the like, thereby acquiring a radiographic image.

Furthermore, recently, a technique for acquiring a digital image using, as the image receiving means, a photoelectric conversion apparatus in which pixels each made up of a very small photoelectric conversion element, switching element, and the like, are arranged in a matrix, has been developed.

FIG. 2 is an explanatory view of a conventional radiographic apparatus using a photoelectric conversion apparatus. A photoelectric conversion apparatus 7 serving as a light-receiving means and consisting of amorphous silicon is disposed behind a phosphor 5. In the photoelectric conversion apparatus 7, a plurality of pixels are formed in a matrix by stacking various semiconductor layers on the surface, at the side of the phosphor, of a transparent glass substrate having a thickness of several mm and both surfaces polished.

A radiation source 1 is connected to the output from a radiation generating apparatus 11, and the output from a radiographic unit 2 is connected to an A/D converter 12. The radiation generating apparatus 11 and A/D converter 12 are connected to a CPU 14, temporary storing apparatus 15, external storing apparatus 16, and display apparatus 17 via a bus line 13.

In general radiography, radiation generated by the radiation source 1 in response to a signal from the CPU 14 is transmitted through, absorbed, and scattered by the object S. This radiation is converted into fluorescence by the phosphor 5 via the grid 4, and is further converted into visible light by the phosphor 5. The converted visible light illuminates the pixels on the photoelectric conversion apparatus 7, which detects that light as a radiographic image analog signal having information of the object S. The radiographic image analog signal- is converted into a digital signal by the A/D converter 12, and the digital signal is transferred to the temporary storing apparatus 15. Also, the digital signal is transferred to and stored in the external storing apparatus 16. Furthermore, the digital signal is subjected to an image process suited for diagnosis, and is indicated on the display apparatus 17 for the purpose of diagnosis.

On the other hand, a radiographic apparatus in which a phosphor is stacked on two-dimensional photoelectric conversion elements comprising CCDs, amorphous silicon or amorphous selenium is known.

An example of merits expected using an apparatus such as the CR apparatus, photoelectric conversion apparatus, and the like, which can directly acquire digital data, is as follows. An image process is facilitated, and correction of improper photographing condition, image emphasis of the region of interest, and the like can be easily achieved. Using an image communication means such as a facsimile apparatus or the like, expert doctors in urban hospitals can make diagnosis for patients in remote places without any expert doctors. Furthermore, when image digital data are stored in magnetooptical disks or the like, the storage space can be greatly reduced as compared to a case wherein films are stored. Also, since previous images can be easily searched, a reference image can be indicated more easily than a case wherein films are to be searched.

However, in the above-mentioned conventional arts, the output of the radiographic apparatus is unstable. In a screen film system using a film as the image receiving means, as shown in FIG. 1, the output becomes unstable due to the use of films. Films have sensitivity differences depending on their manufacturing lots and management conditions, and a sensitivity difference as large as about 10% is often observed. The film temperature upon photographing largely influences the sensitivity, and films photographed irrespective of these film sensitivity differences suffer large variations in photographic density. Furthermore, when photographed films are developed, the temperature of the developing solution, the developing time, and the fatigue of the developing solution often considerably change the photographic density. As described above, in the screen film system that uses films with unstable sensitivities and photographic densities as the image receiving means, it is very hard to obtain constant photographic densities. The system requires of a radiographic engineer much labor such as checking of the film sensitivity, maintenance of an automatic developing machine, and the like to stabilize the photographic density.

Even the CR apparatus that uses the imaging plate as the image receiving means suffers a problem called fading. Fading is a phenomenon in which the radiographic image information accumulated on the imaging plate upon irradiation of the radiation decreases over time until it is read. As is known, if one hour has elapsed at 32° C., the light emission amount decreases by about 20 to 40%. The imaging plate is normally sealed in a portable light-shielding member called a cassette, and is carried into a photographing site. In an imaging plate reading apparatus, since the time elapsed from photographing until reading is unknown, the output becomes unstable due to fading. Also, since the fading characteristics are influenced by temperature, even when the time elapsed from photographing until reading is known, it is difficult to stabilize the output.

In order to solve the above-mentioned problem, the CR apparatus has a function of outputting a constant photographic density by changing the read gain of the imaging plate irrespective of the fading characteristics and the dose of radiation by utilizing its feature that enables acquisition of a digital image. On the other hand, the read gain value is often used as an index for the dose of radiation. However, since this gain value simultaneously corrects both the fading characteristics and dose of radiation, there is no means for detecting if the dose of radiation is truly proper. For this reason, if the dose of radiation is determined with reference to the gain value and output image, the object, especially a patient, may be exposed to excessive radiation in the next photographing.

Also, the radiographic apparatus using the photoelectric conversion apparatus 7 as the image receiving means, as shown in FIG. 2, suffers an unstable output. This is because the characteristics of the photoelectric conversion device 7 may change over time. The photoelectric conversion apparatus 7 is normally made up of semiconductor elements obtained by lightly doping a substance into silicon single crystal or amorphous silicon, and the optical input/output characteristics of a semiconductor element change in accordance with temperature. Also, when currents are accumulatively supplied to the semiconductor element, the semiconductor element deteriorates at certain odds, and its optical input/output characteristics may change. These factors also lower the output stability.

In the photoelectric conversion apparatus 7, as a method of solving this problem, a method of stabilizing the output using the optical input/output characteristics of the photoelectric conversion apparatus 7 that can be obtained from black- and white-level signals may be used. The black-level signal is an output signal obtained when no light enters the photoelectric conversion apparatus 7, i.e., a dark output, and the white-level signal is an output signal obtained when the predetermined amount of light Is input to the photoelectric conversion apparatus 7. It is effective to acquire at least one of the black- and white-level signals as needed and to stabilize the output. Especially, when the optical input/output characteristics of the photoelectric conversion apparatus 7 are to be accurately obtained, it is indispensable to acquire both the black- and white-level signals.

As an example of the method of stabilizing the output using the optical input/output characteristics obtained from the black- and white-level signals, the following method may be used. An input image signal, black-level signal, and white-level signal for a predetermined amount of light are acquired in units of pixels. The black-level signal is subtracted from the image signal and white-level signal to obtain a second image signal and second white-level signal. The black-level signal represents an offset in units of pixels, and the process for subtracting the offset is generally called offset correction. The predetermined light amount is then divided by the second white-level signal to obtain a gain signal in units of pixels. Furthermore, the second image signal is multiplied by the gain signal to obtain an output image signal from which the optical input/output characteristics of the photoelectric conversion apparatus 7 are calibrated. This process is generally called gain correction.

Let $d(x, y)$ be the black-level signal, $w(x, y)$ be the white-level signal, $i(x, y)$ be the input image signal, $o(x, y)$ be the output image signal, $k(x, y)$ be the predetermined light amount distribution, and $g(x, y)$ be the gain signal. Then, formulas for performing the above-mentioned processes for a two-dimensional image are:

$$w'(x, y) = w(x, y) - d(x, y)$$

$$i'(x, y) = i(x, y) - d(x, y)$$

$$g(x, y) = k(x, y)/w'(x, y)$$

$$= k(x, y)/\{w(x, y) - d(x, y)\}$$

$$o(x, y) = i'(x, y) \times g(x, y)$$

$$= k(x, y) \times \{i(x, y) - d(x, y)\}$$

$$/\{w(x, y) - d(x, y)\}$$

However, when the photoelectric conversion apparatus 7 is used in the radiographic apparatus, since it is stored in the housing 3 that shields the apparatus 7 from external light, it is impossible to acquire any white-level signal by inputting light to the photoelectric conversion apparatus 7. In order to acquire the white-level signal in this state, radiation must be irradiated onto the radiographic apparatus to cause stimulated emission of the phosphor 5 stored in the housing 3. However, irradiation of the radiation onto the radiographic apparatus without any patient in each photographing applies a heavy load on the radiographic engineer, and the inspection time per patient is prolonged. For this reason, it becomes hard to photograph a large number of patients within a short period of time. When radiation is frequently irradiated to acquire the white-level signal, the service life of a tube that generates radiation is shortened.

As a method of solving such problem, during warm-up operation of the radiation tube which is ordinarily done as a routine work upon starting up the radiographic apparatus, radiation is irradiated onto the radiographic apparatus to acquire black- and white-level signals. With this method, the output of the radiographic apparatus using the photoelectric conversion apparatus is expected to be stable. However, as has already been described above, since the output from the photoelectric conversion apparatus varies as temperature changes, the output may vary due to changes in characteristics of the photoelectric conversion apparatus in image acquisition at the startup timing of the apparatus.

FIG. 3 is a graph in which the abscissa plots the temperature of the photoelectric conversion apparatus, and the ordinate plots the output relative to the output at a temperature of 25° C. The solid curve in FIG. 3 indicates the output of the photoelectric conversion apparatus when a predetermined amount of light is input, and the dotted curve indicates the dark output of the photoelectric conversion apparatus when light is shielded. As can be seen from FIG. 3, the output of the photoelectric conversion apparatus upon inputting a predetermined amount of light gradually increases as the temperature rises, while the dark output of the photoelectric conversion apparatus upon shielding light rapidly increases as the temperature rises. Hence, when black- and white-level signals are acquired at the startup timing of the radiographic apparatus, and a radiographic image photographed after the radiographic apparatus was sufficiently warmed up is calibrated using these signals, erroneous calibration may be done. As a consequence, the output of the radiographic apparatus becomes unstable depending on the warm-up state of the apparatus.

As described above, conventional radiographic apparatuses suffer unstable outputs irrespective of the types of image receiving means. In order to stabilize the output, much labor such as checking of the film sensitivity, maintenance of an automatic developing machine, and the like is required.

SUMMARY OF THE INVENTION

It is an object of the present invention to provide a radiographic apparatus which can solve the above-mentioned problems, which can obtain an output with high reproducibility accurately corresponding to the dose of incoming radiation, and can obtain a stable output irrespective of the time elapsed from photographing until image output, changes in photographing environment, and the like.

Other objects of the present invention will become apparent from the following description of the embodiments.

DESCRIPTION OF THE PREFERRED EMBODIMENTS

The present invention will be described in detail hereinafter with reference to embodiments illustrated in FIGS. 4 and 5

Figure 1:
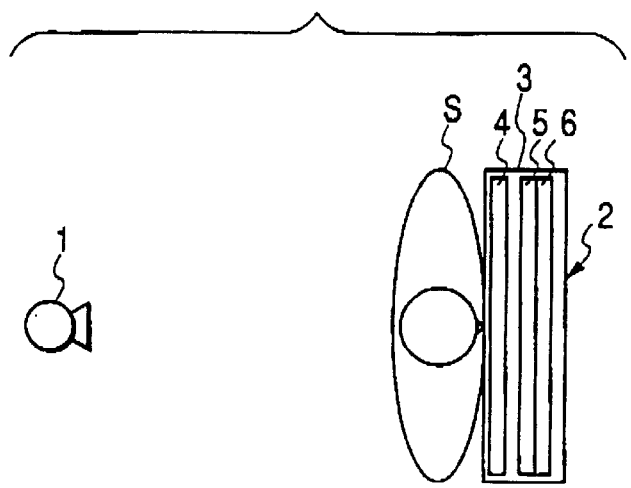
FIG. 1 is an explanatory view of a conventional radiographic apparatus using a screen film system.
Figure 2:
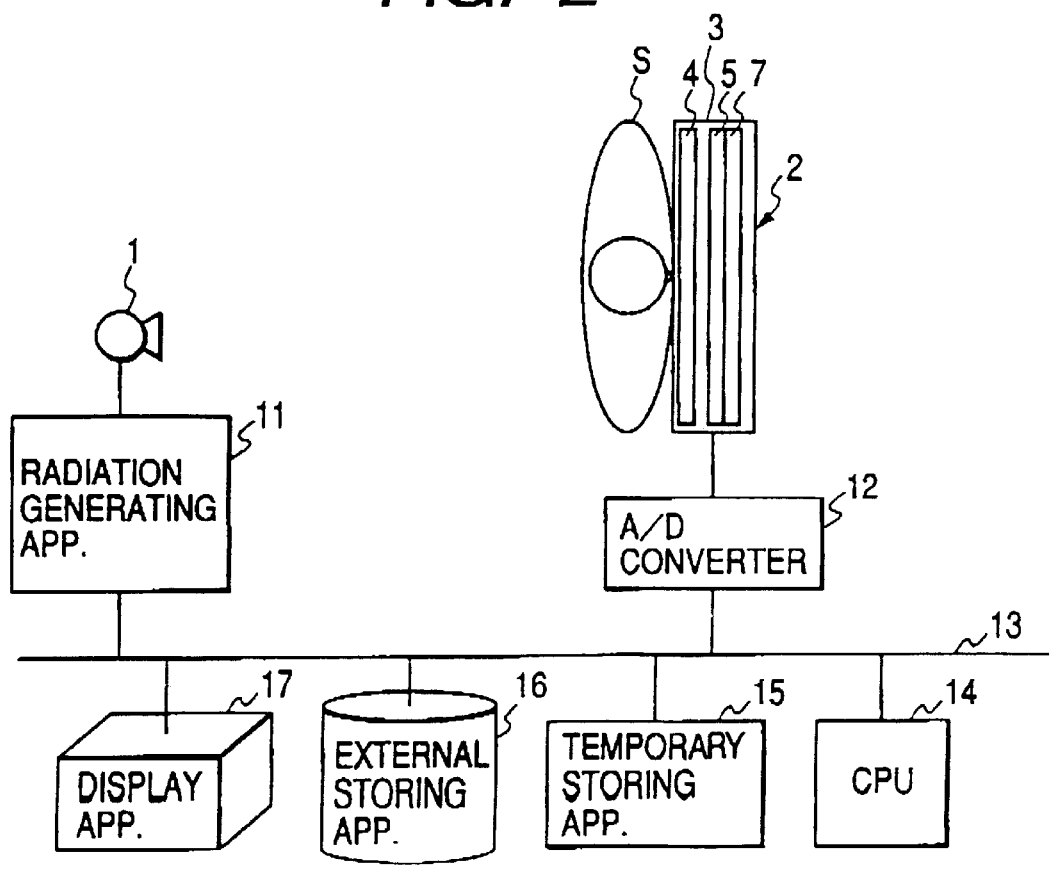
FIG. 2 is a diagram for explaining a conventional radiographic apparatus using a photoelectric conversion apparatus.
Figure 4:
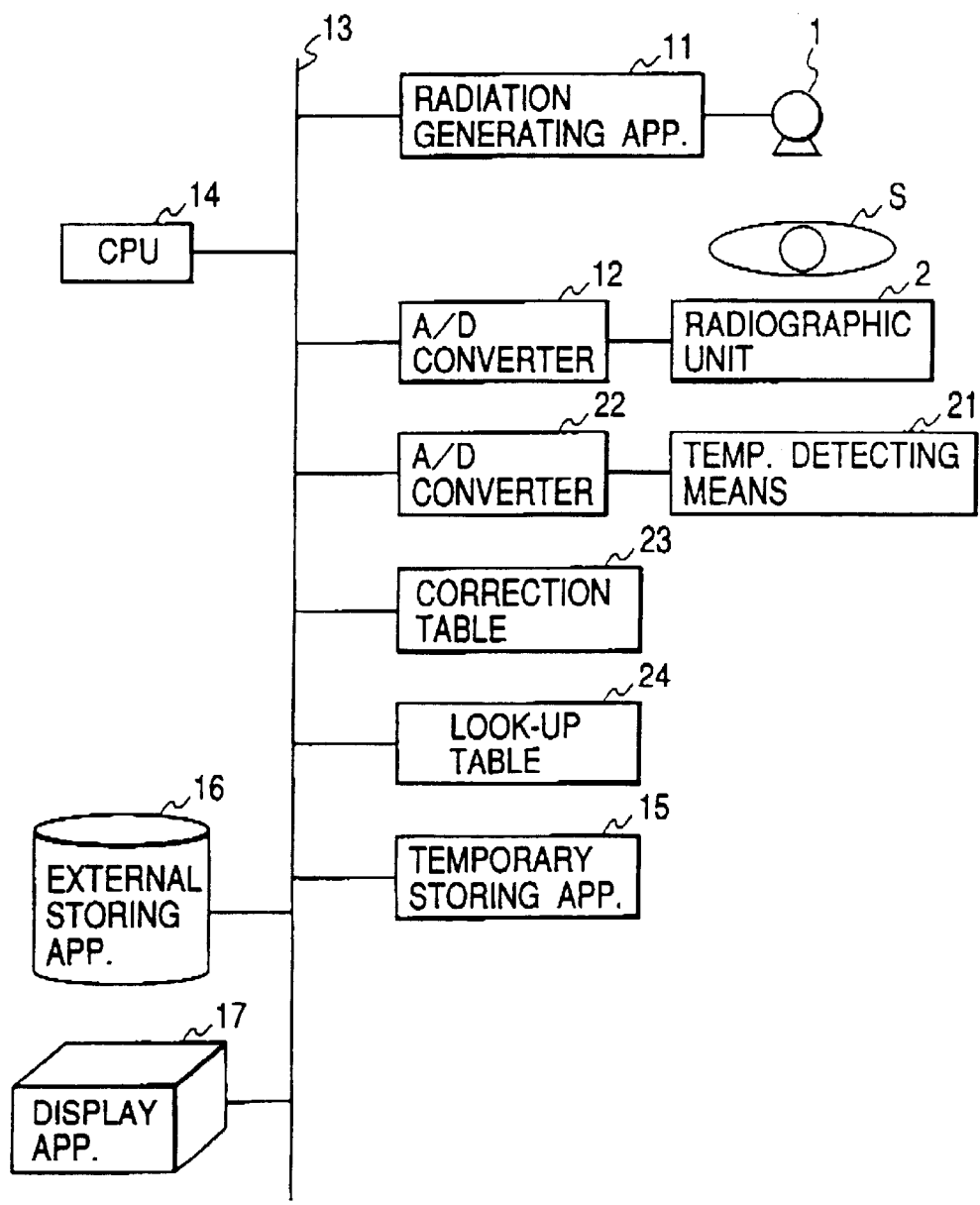
FIG. 4 is a diagram for explaining a radiographic apparatus according to the first embodiment of the present invention.

In FIG. 4, the structures of a radiation source 1 and radiographic unit 2 are the same as those in FIG. 2, and a photoelectric conversion apparatus 7 is used as an image receiving means. Also, as in the conventional art, a radiation generating apparatus 11 is connected to the radiation source 1, and an A/D converter 12 is connected to the radiographic unit 2. A temperature detecting means 21 for detecting the temperature of the radiographic unit 2 (especially, that of the photoelectric conversion apparatus 7) is connected to a bus line 13 via an A/D converter 22, and a CPU 14, correction table 23, LUT (look-up table) 24, temporary storing apparatus 15, external storing apparatus 16, and display apparatus 17 are connected to the bus line 13.

Prior to photographing, in order to acquire black- and white-level signals in advance, and to obtain the optical input/output characteristics, radiation having a uniform spatial intensity distribution and a predetermined intensity is irradiated onto the radiographic unit 2 during warm-up operation of a tube of the radiation source 1. The radiation to be irradiated may be the one having a spatial distribution equal to that actually used in photographing as long as its intensity distribution is known. Such two-dimensional radiation intensity distribution can be confirmed by a film using a conventional screen film system.

An analog signal output from the radiographic unit 2 in response to the irradiated radiation corresponds to a white-level signal, which is converted into a digital signal by the A/D converter 12, and is transferred to the temporary storing apparatus 15 via the bus line 13. Again, the radiographic unit 2 is driven to acquire a black-level signal similarly output from the photoelectric conversion apparatus 7 while the apparatus 7 is shielded from external light. The black-level signal represents the dark output of the photoelectric conversion apparatus 7, and is used in offset correction of the white-level signal.

In this manner, the radiographic unit 2 acquires a black-level signal immediately before or after photographing the object S, or preferably, in synchronism with operation of the start button of the radiation generating apparatus 11. Furthermore, radiation is irradiated onto the object S to acquire a radiographic image signal, and at the same time, the output from the temperature detecting means 21 for detecting the temperature of the photoelectric conversion apparatus 7 is converted into a digital signal by the A/D converter 22. These signals are transferred to the CPU 14, and are compared with the input/output characteristics and the temperature upon acquiring those characteristics, which are pre-stored in the temporary storing apparatus 15, thus calibrating the image and outputting the calibrated image as an image signal.

The image calibration method will be explained below. A gain signal g0(x, y) is calculated from a white-level signal w0(x, y) and black-level signal d0(x, y) acquired in advance. Note that data measured in advance are appended with suffix 0 to indicate this.

$$g0(x, y) = k0(x, y) / \{w0(x, y) - d0(x, y)\} \quad (1)$$

where k0(x, y) is the radiation intensity distribution upon acquiring the white-level signal.

Subsequently, offset correction is done for an image signal i(x, y) upon photographing. The signals used in this calculation have no suffices since they are signals obtained upon acquiring an image.

$$i'(x, y) = i(x, y) - d(x, y) \quad (2)$$

Then, gain correction is executed.

$$i''(x, y) = i'(x, y) \times g0(x, y)$$
$$= k0(x, y) \times \{i(x, y) - d(x, y)\}$$
$$/ \{w0(x, y) - d0(x, y)\} \quad (3)$$

Furthermore, by comparing the temperature of the photoelectric conversion apparatus 7 upon acquiring the input/ output characteristics with that upon photographing, the image signal is calibrated. In this embodiment, since the black-level signal is acquired upon photographing, calibration is done by considering only changes in white-level signal between the acquisition timing of the input/output characteristics and the photographing timing.

Figure 3:
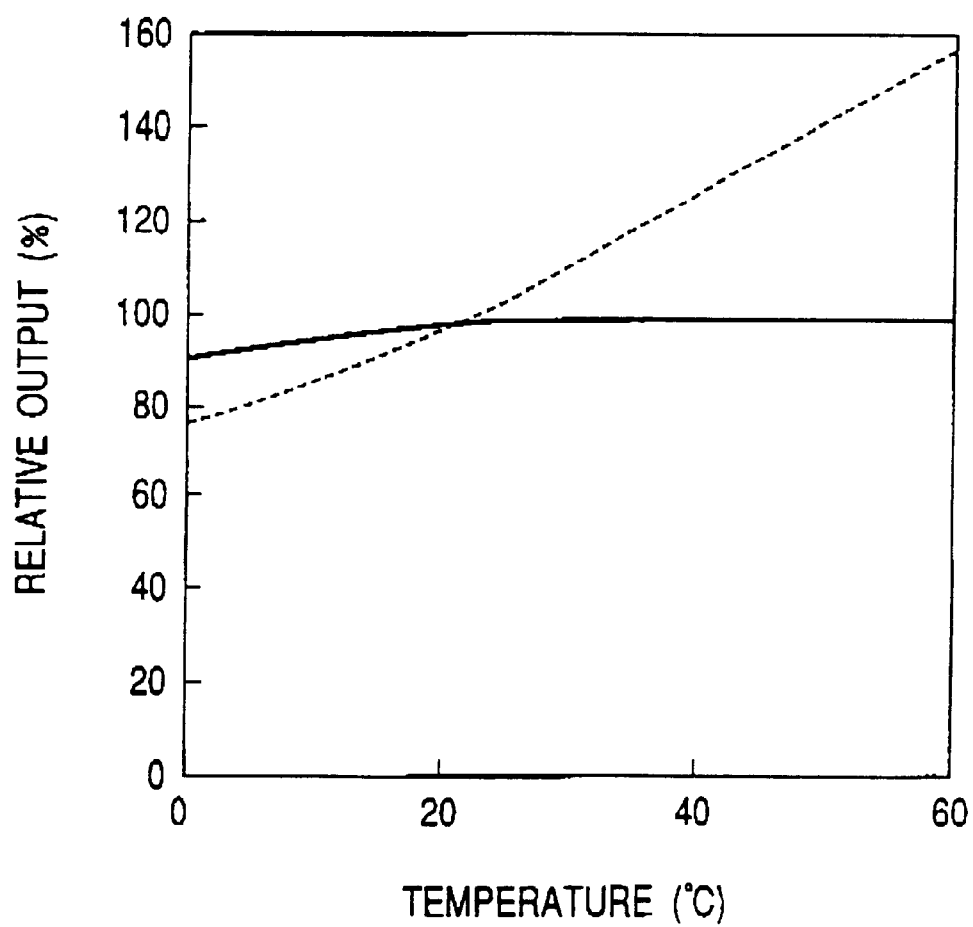
FIG. 3 is a graph showing the relationship between the output from the photoelectric conversion apparatus and temperature.

The correction table 23 stores an inverse function of the white-level output temperature characteristics shown in FIG. 3, and has a function of outputting a correction value upon receiving temperatures at the acquisition timing of the input/output characteristics and the photographing timing. This correction is a kind of gain correction using temperature as a variable. Let $c(x, y)$ be the correction value. Then, a calculation for outputting a final image signal $o(x, y)$ is:

$$o(x, y)=i''(x, y)\times c(x, y) \quad (4)$$

Since the above-mentioned processes are completed within a maximum of 1 sec, the operation time of the radiographic engineer does not increase at all.

In this embodiment, the input/output characteristics are preferably acquired at the startup timing of the radiation tube, i.e., almost every day. However, when the correction table 23 has sufficiently high reliability, the number of times of acquisition of the input/output characteristics may be reduced as much as possible, for example, the characteristics may be acquired once when the radiographic apparatus is manufactured, when the apparatus is set, or at the timings of periodic maintenance.

In this embodiment, the input/output characteristics measured in advance and corresponding to pixels must be stored. However, when an image is calibrated with high accuracy, these values require a resolution as high as about 12 bits. Since these values have many information volumes, they are preferably compressed and stored within limits that do not impair the resolution.

In this embodiment, the black-level signal is acquired at roughly the same time with photographing. As can be seen from FIG. 3, since the black-level signal upon photographing is obtained by multiplying that upon acquiring the input/output characteristics by a temperature coefficient, the black-level signal upon acquiring the input/output characteristics may be subjected to temperature correction, and the corrected signal may be used as that upon photographing. In this case, since the radiographic unit 2 need not be driven a plurality of number of times, a high-speed process can be realized.

Conversely, as can be seen from FIG. 3, since the black-level signal represents the temperature characteristics themselves of the photoelectric conversion apparatus 7 and its peripheral circuits, the average value of black-level signals may be input to the correction table 23 as a substitute value of the temperature characteristics, so as to calibrate the output.

The temperature detecting means 21 may detect the temperature of peripheral circuits that receive an image signal from the photoelectric conversion apparatus 7.

Furthermore, the warm-up state of the apparatus, in this case, the temperature of the photoelectric conversion apparatus 7 and its peripheral circuits, is roughly determined by the total energization time from the startup timing of the radiographic unit 2. Hence, in place of the temperature characteristics, an image may be calibrated using the times at the acquisition timing of the input/output characteristics and the photographing timing. When changes in input/output characteristics are observed in correspondence with the total energization time in addition to the temperature characteristics, such characteristics may be similarly measured in advance and input to the correction table 23 to allow correction (a detailed description thereof will be omitted).

As described above, when the relationship between a factor value that influences the output, and the output is input in advance to the correction table, factor values are measured at both the acquisition timing of the input/output characteristics and the photographing timing, and an image is calibrated using the correction table 23, a radiographic apparatus with stable output can be obtained without acquiring any input/output characteristics in each image acquisition.

The LUT 24 performs window processes (window, level, curve shape) for the calibrated image signal, and shapes it into an image to be displayed on the display apparatus 17 in a format suitable for diagnosis. The image shaped by the LUT 24 is displayed on the display apparatus 17. This LUT 24 uses a single function for pixels $o(x, y)$ on the entire screen. In this respect, the function of the LUT 24 is different from that of the above-mentioned correction table 23 that can use different functions in units of pixels in this embodiment, but is basically the same in terms of pixel value conversion attained by using a function for each pixel value. Hence, using the same basic function, the LUT 24 and correction table 23 may be combined into a single module.

Figure 5:
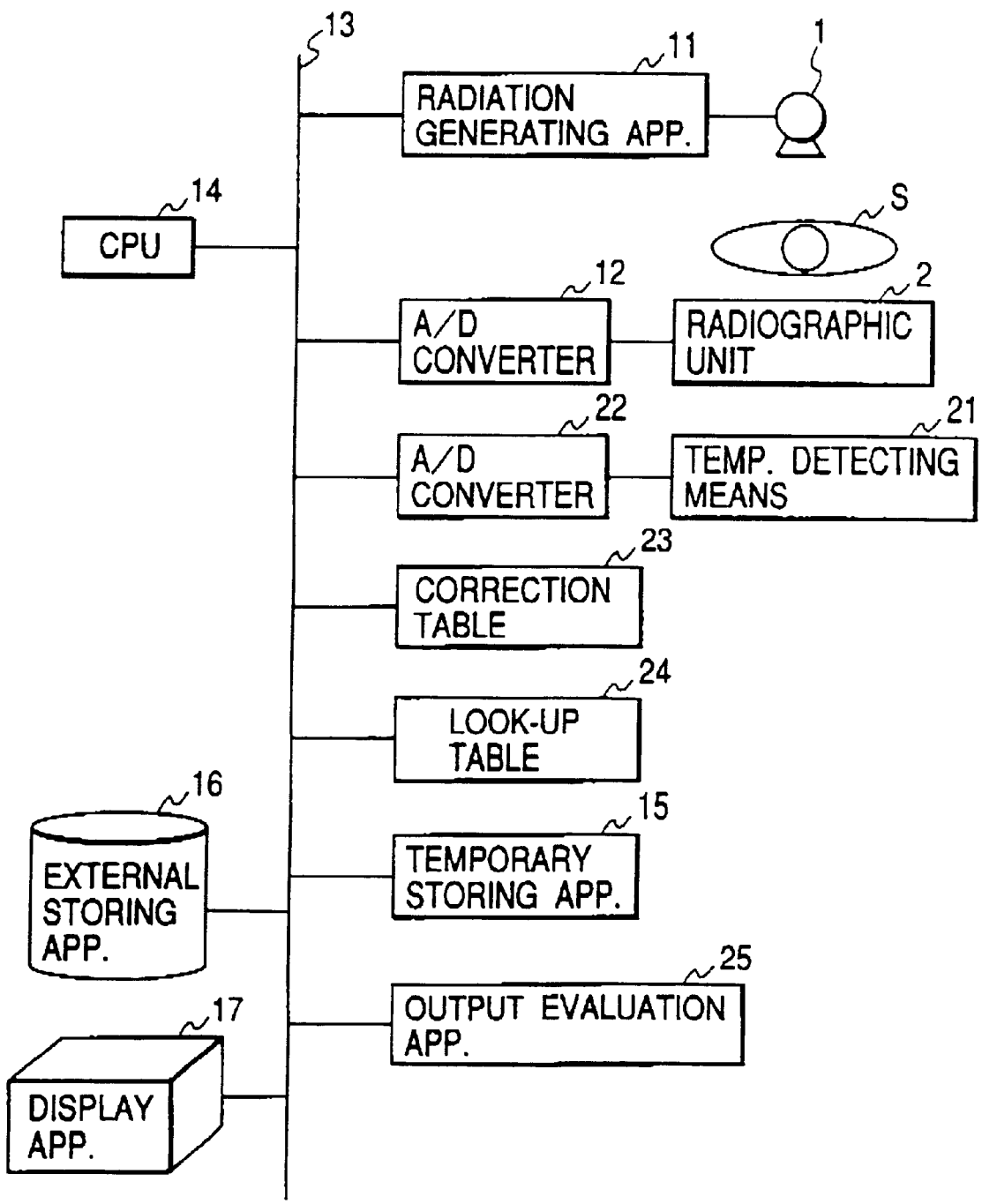
FIG. 5 is a diagram for explaining a radiographic apparatus according to the second embodiment of the present invention.

FIG. 5 shows the second embodiment of the present invention. In addition to the arrangement of the first embodiment, an output evaluation apparatus 25 is connected to the bus line 13. In this case, the reliability of the correction table 23 can be improved, and the number of times of acquisition of the input/output characteristics can be reduced as much as possible. The output evaluation apparatus 25 comprises, e.g., a film densitometer, and measures the photographic density of the photographed film to evaluate whether or not the final output is stable.

For example, in facilities where the radiographic apparatus is periodically inspected once a week, if the photographing density obtained by inputting a predetermined dose to the radiographic apparatus is different from that obtained in the periodic inspection a week ago, the correction table 23 is automatically corrected using the difference between the two photographic densities and the temperature values upon outputting these densities, so as to stabilize the next photographing output. Using such feedback method, the correction table 23 is always updated to improve its reliability, thus reducing the acquisition frequency of the input/output characteristics.

In the above description, the photographic density is used as feedback data. However, the present invention is not limited to such specific data. For example, digital data for giving a photographic density may be used. In this case, instability of a printer that outputs a film can be ignored.

Another embodiment of the present invention will be described below.

In the two embodiments described above, environmental variations are detected to automatically correct the correction table so as to perform automatic correction. However, this embodiment does not perform automatic correction. Instead this embodiment determines an allowable environmental variation range in advance, and has means for informing the user of the necessity of re-acquisition of correction data when an environmental variation beyond the range has taken place. The arrangement of this embodiment is the same as that shown in FIG. 4. Black- and white-level signals are acquired. At this time, the temperature detecting means 21 also acquires the temperature upon acquiring these two signals. The usable range of this correction data is determined to be, e.g., ±5° C. During photographing, the temperature detecting means always monitors the temperature of a sensor unit, and compares it with the temperature upon acquiring the black and white-level signals for correction. If the temperature falls within the ±5° C. range, the photographed image is corrected using the previously acquired correction data. If a temperature variation beyond ±5° C. has taken place, since correction errors increase and the subsequent photographing may result in poor image quality, a message indicating the necessity of re-acquisition of correction data is displayed on the display apparatus 17. When such message is displayed, the user is directed to re-acquire black- and white-level data for correction, thus realizing optimal correction.

Still another embodiment of the present invention will be described below.

A sensor unit in the radiographic unit must be large enough to photograph individual portions of the human body. In this embodiment, an a-Si semiconductor sensor having a size of 43 cm×43 cm is used. Normally, such a semiconductor sensor requires many external circuits to electronically read out data. The external circuits include a signal read amplifier, A/D converter, drive IC, control circuit, and the like, and are arranged around the sensor. These peripheral circuits produce heat during operation. For this reason, when the sensor is not used, it is set in a sleep mode and the read amplifier is set active only when a signal is read out, thus suppressing heat generation. However, when the apparatus is repetitively used as in group diagnosis or the like, the heat generation amount increases, and the temperature of the sensor unit in the vicinity of the peripheral circuits rises. For this reason, the temperature distribution of the sensor unit is not uniform, and the temperature of a specific portion rises considerably. Since the temperature and the signal level of the sensor output signal are proportional to each other, correction signal data acquired when the sensor has a uniform temperature distribution upon power ON can no longer be used after the sensor unit has an extremely different temperature distribution. Such a problem can be solved if correction black- and white-level data are acquired in each photographing. However, when images of a large number of patients are to be photographed per day, this method requires complicated operation and is not practical. Especially, white-level data must be acquired by irradiating X-rays without any patient, and the load on the operator is heavy. When the sensor has different temperature distributions depending on its portions, the temperatures of the individual portions of the sensor must be detected so as to attain correction using temperature coefficients, resulting in a large-scale temperature detecting means.

This embodiment exploits correlation between the temperature at a given point of the sensor unit and the temperature distribution pattern of the overall sensor. That is, the temperature at one point of the sensor is measured by the temperature detecting means. Then, using correction data at that temperature, which are stored in advance in the external storing apparatus, an optimal corrected image is generated.

Figure 6:
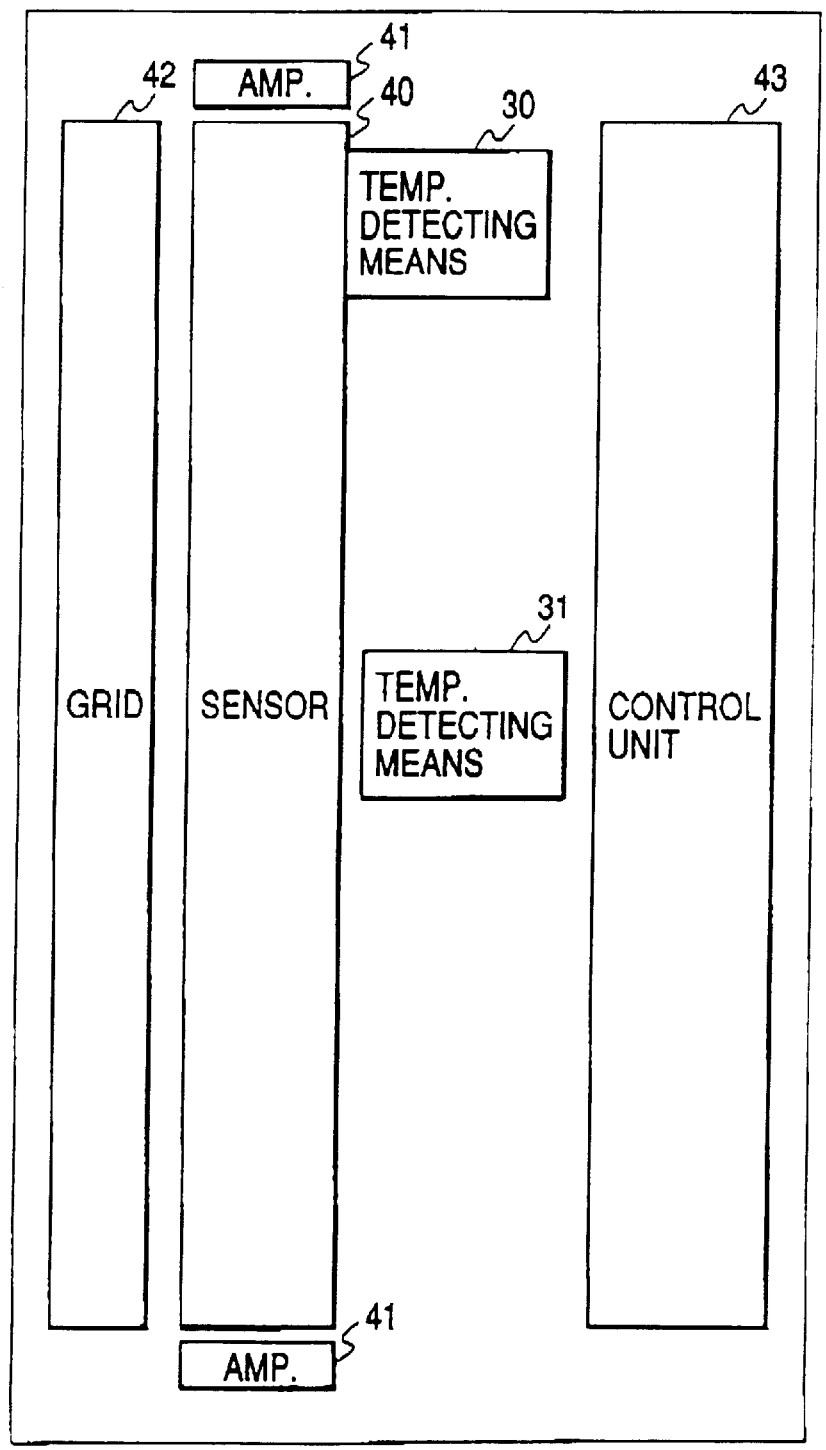
FIG. 6 is a partial explanatory view of a radiographic apparatus according to another embodiment of the present invention.

FIG. 6 shows the layout of the individual elements and temperature detecting means in the radiographic unit 2 that stores the sensor unit.

In FIG. 6, the radiographic unit 2 comprises temperature detecting means 30 and 31, a sensor unit 40 including a phosphor and image sensing element (neither are shown), an amplifier 41 for amplifying a signal output from the image sensing element, a grid 42, and a control unit 43 including circuits for outputting the amplified image signal output from the amplifier 41 to an external circuit, and controlling the respective elements. Note that FIG. 6 is prepared for the purpose of expressing the layout of the individual elements, and does not illustrate any wiring lines and the like for the sake of easy understanding. Other arrangements are the same as those in FIG. 4.

In FIG. 6, an object is located on the left side of the radiographic unit 2, and is irradiated with X-rays from the left side. The temperature detecting means 30 is disposed near a portion of the sensor unit 40 near the amplifier 41, that has the largest temperature rise, and detects the temperature (Ts) at that portion. On the other hand, the temperature detecting means 31 detects the temperature (Ta) inside the radiographic unit 2, i.e., the ambient temperature of the sensor.

Correction date are acquired upon power ON in the morning in the state of Ts−Ta=0. After that when actual photographing is repetitively done, Ts rises, and Ts−Ta=Td. Td corresponds to the temperature rise of the portion of the sensor, that has the largest temperature rise.

The correction is done as follows. Upon delivery from a factory, the signal patterns of the sensor signals of the individual sensors with respect to Ts due to a temperature rise upon irradiation of uniform X-rays with known intensity are stored in an external storing apparatus such as an HDD (not shown) in 5° C. increments of Td together with the ambient temperatures Ta upon acquiring the signals. In actual photographing, correction data are acquired upon power ON in the morning. Ta' represents the ambient temperature at that time. Immediately after power ON, Td=0. When there are many patients, the temperature distribution of the sensor unit becomes not uniform due to the influences of the peripheral circuits, resulting in Td≠0. When Td has reached 5° C., since correction data used so far cannot attain sufficient correction, the signal pattern at Td=5° C. stored in the external storing apparatus is read out as F(x, y). Using the ambient temperature Ta' and temperature coefficient, F(x, y) is calculated to correct for changes in temperature so as to obtain F'(x, y). The reciprocal number 1/F'(x, y) of the obtained F'(x, y) is written in the correction table in place of c(k, y) above. Since the temperatures of the individual portions of the sensor have a certain functional relationship with the output signal value, and the difference between Ta' and Ta corresponds to an offset of the signal value, such calculation can be made. In actual photographing, 1/F'(x, y) is used in place of c(x, y) in equation (4) to attain correction. When photographing further continues, Td=10° C., and the same calculation as above is made. In this manner, even when the temperature of the sensor unit becomes nonuniform due to elevated temperatures of the peripheral circuits, satisfactory correction can always be done.

In the above embodiments, the means for detecting radiation includes the phosphor and photoelectric conversion apparatus. However, the present invention is not limited to such specific means. The present invention is effective for a radiographic apparatus having input/output characteristics in units of pixels. For example, in addition to the above embodiments, the present invention may be applied to compensation for variations of radiation-electron input/output characteristics in a radiographic apparatus using an electron detection apparatus for detecting, in units of pixels, electrons produced by, e.g., a radiation-electron converter such as amorphous selenium, CdTe, ionization chamber, or the like for converting radiation into electrons.

The radiographic apparatus according to each of the above embodiments has high reproducibility of photographing since it can always obtain an identical output if an identical dose is given to an identical object. Since the precision management of the entire radiographic image acquisition system including the radiation generating apparatus can be easily attained, no re-photographing is required. In addition, the output can be stabilized without acquiring input/output characteristics in every photographing operation.

What is claimed is:

1. An apparatus for photographing a radiographic image, comprising:

an image sensing system for obtaining a radiographic image;

an image processing system for correcting the radiographic image obtained by said image sensing system using input/output characteristics in units of pixels of said image sensing system, and outputting the corrected radiographic image; and a predetermined factor detecting unit for monitoring a predetermined factor value that relates to the input/output characteristics, wherein the predetermined factor value is a photographing time.

2. An apparatus for photographing a radiographic image, comprising:

an image sensing element for directly or indirectly sensing a radiographic image; and a signal processing system for correcting image data obtained by said image sensing element using input/output characteristics in units of portions of said image sensing element, and outputting the corrected image data, wherein said signal processing system corrects the image data using a correction table while updating the correction table in accordance with a photographing time that relates to the input/output characteristics.

3. An apparatus for photographing a radiographic image, comprising:

an image sensing element for directly or indirectly sensing a radiographic image; and a signal processing system for correcting image data obtained by said image sensing element using input/output characteristics in units of portions of said image sensing element, and outputting the corrected image data, wherein said signal processing system corrects the image data using an output from a predetermined factor detecting unit that detects a predetermined factor relating to the input/output characteristics and a correction table for use in gradation processing, and said processing system changes the correction table based on the output from said predetermined factor detecting unit.

4. An apparatus for photographing a radiographic image, comprising:

an image sensing system for obtaining a radiographic image;

an image processing system for correcting the radiographic image obtained by said image sensing system using input/output characteristics in units of pixels of said image sensing system, and outputting the corrected radiographic image; and a predetermined factor detecting unit for monitoring a predetermined factor value that relates to the input/output characteristics, wherein the predetermined factor value is total energization time from a startup timing of the image sensing system or an acquisition timing of the input/output characteristics and a photographing timing.

5. An apparatus according to claim 1, wherein said signal processing system updates the correction table in accordance with total energization time from the startup timing of the image sensing system or at an acquisition timing of the input/output characteristics and a photographing timing.

6. An apparatus for photographing a radiographic image, comprising:

an image sensing element for directly or indirectly sensing a radiographic image; and a signal processing system for correcting image data obtained by said image sensing element using a correction table to compensate for variation in input/output characteristics in units of portions of said image sensing element, and outputting the corrected image data, wherein said signal processing system evaluates an output from said signal processing system, and updates the correction table as needed based on said evaluation result, or based on a measured photographic density of a photographed film.

7. An apparatus for photographing a radiographic image, comprising:

an image sensing system for obtaining a radiographic image;

an image processing system for correcting the radiographic image obtained by said image sensing system using input/output characterisitics in units of pixels of said image sensing system, the input/output characteristics including at least gain information of said image sensing system; and a predetermined factor detecting unit for detecting a predetermined factor that relates to at least the gain information.

8. An apparatus according to claim 7, wherein said image processing system comprises a correction table which indicates a relationship between a factor value detected by said predetermined factor detecting unit and the input/output characteristics, and said image processing system corrects the radiographic image using an output from said predetermined factor detecting unit and said correction table.

9. An apparatus according to claim 7, wherein said image processing system comprises a correction table which indicates a relationship between: (i) a difference between factor values detected by said predetermined factor detecting unit at an acquisition timing of the input/output characteristics and at an acquisition timing of an image by the image sensing system, and (ii) the input/output characteristics at the acquisition timing of the image, where said image processing system corrects the radiographic image using an output from said predetermined factor detecting unit and said correction table.

10. An apparatus according to claim 7, wherein said image sensing system comprises a photoelectric conversion element, and the predetermined factor is at least one of a temperature of said photoelectric conversion element and a temperature of an electric circuit that acquires the output from said photoelectric conversion element.

11. An apparatus according to claim 7, wherein said image sensing system comprises a photoelectric conversion element, and the predetermined factor is a dark output of said photoelectric conversion element.

12. An apparatus according to claim 7, wherein the predetermined factor is a photographing timing.

13. An apparatus according to claim 8, further comprising means for evaluating an output from said image processing system, wherein said image processing system updates said correction table as needed in accordance with the output from said evaluating means or based on a measured photographic density of the photographed film.

14. An apparatus according to claim 9, further comprising means for evaluating an output from said image processing system, wherein said image processing system updates said correction table as needed in accordance with the output from said evaluating means or based on a measured photographic density of the photographed film.

15. An apparatus according to claim 7, wherein said image sensing system comprises a radiation-electron converter and an electron detecting element, wherein the predetermined factor is at least one of a temperature of said radiation-electron converter, a temperature of said electron detecting element, and a temperature of an electric circuit acquiring the output from said electron detecting element.

16. An apparatus according to claim 15, wherein said radiation-electron converter comprises one of amorphous selenium, CdTe, and an ionization chamber.

17. An apparatus according to claim 7, further comprising display means for prompting a user to change the input/output characteristics used by said image processing system in accordance with a detection result of said predetermined factor detecting unit.

18. An apparatus according to claim 7, wherein the predetermined factor is at least one of a temperature difference of a specific portion of said image sensing system with respect to a reference temperature and a temperature of a reference portion of said image sensing system.

19. An apparatus according to claim 7, wherein said image processing system corrects the radiographic image using an output from said predetermined factor detecting unit and a correction table that compensates for variation in the input/output characteristics.

20. An apparatus according to claim 7, wherein said image processing system corrects the radiographic image using an output from said predetermined factor detecting unit and a correction table that compensates for variation in the input/output characteristics, and changes the correction table in accordance with the output of said predetermined factor detecting unit.

21. An apparatus according to claim 7, wherein the input/output characteristics used by said image processing system include gain information and offset information of said image sensing system, and said predetermined factor relates to the gain information and the offset information.

* * * * *

UNITED STATES PATENT AND TRADEMARK OFFICE
CERTIFICATE OF CORRECTION

PATENT NO. : 6,265,720 B1
DATED : July 24, 2001
INVENTOR(S) : Tatsuya Yamazaki et al.

It is certified that error appears in the above-identified patent and that said Letters Patent is hereby corrected as shown below:

Title page,
Item [56], References Cited,
FOREIGN PATENT DOCUMENTS
"5-6161781" should read -- 56-161781 --.
Item [57], ABSTRACT,
Line 1, "image," should read -- image --.

Column 2,
Line 25, "signal - is" should read -- signal is --.

Column 3,
Line 33, "the object," should read -- an object --; and
Line 58, "Is" should read -- is --.

Column 10,
Line 14, "date" should read -- data --.

Signed and Sealed this

Thirtieth Day of April, 2002

Attest:

*Attesting Officer*

JAMES E. ROGAN
*Director of the United States Patent and Trademark Office*